United States Patent [19]
van Vliet

[11] 4,099,749
[45] Jul. 11, 1978

[54] COUPLING SLEEVE

[75] Inventor: Cors van Vliet, Zwolle, Netherlands

[73] Assignee: Air-O-Mulder B.V., Kampen, Netherlands

[21] Appl. No.: 561,345

[22] Filed: Mar. 24, 1975

[30] Foreign Application Priority Data

Apr. 8, 1974 [NL] Netherlands .......................... 7404779

[51] Int. Cl.² .......................................... F16L 21/00
[52] U.S. Cl. ..................................... 285/398; 285/47; 285/424
[58] Field of Search ........... 285/398, 371, 340, 133 R, 285/133 A, 424, 47, 53; 403/300, 305, 314, 332, 287, 286

[56] References Cited

U.S. PATENT DOCUMENTS

| 180,416 | 8/1876 | Clow | 285/398 |
|---|---|---|---|
| 442,837 | 12/1890 | Ward | 285/398 X |
| 1,762,766 | 6/1930 | De Garay | 285/398 X |
| 1,817,772 | 8/1931 | Sipe | 403/300 X |
| 1,817,776 | 8/1931 | Sipe | 285/340 |
| 1,862,260 | 6/1932 | Edmunds | 285/133 A |
| 2,123,889 | 7/1938 | Gleason | 285/371 X |
| 2,325,464 | 7/1943 | Bannister | 285/133 R X |
| 2,360,159 | 10/1944 | Peck | 285/398 X |
| 2,484,192 | 10/1949 | Squiller | 285/340 X |
| 3,033,600 | 5/1962 | Drysdale | 403/305 X |
| 3,512,805 | 5/1970 | Glatz | 285/398 X |
| 3,655,223 | 4/1972 | Johnson | 285/398 X |
| 3,687,168 | 8/1972 | Sherman et al. | 285/424 X |
| 3,774,972 | 11/1973 | Grapengiesser et al. | 285/398 X |
| 3,836,181 | 9/1974 | Kelver | 285/424 X |
| 3,858,995 | 1/1975 | Sand | 403/300 |

FOREIGN PATENT DOCUMENTS 1,425,489  5/1969  Fed. Rep. of Germany ... 285/133 R Primary Examiner—Thomas F. Callaghan
Attorney, Agent, or Firm—Wilkinson, Mawhinney & Theibault

[57] ABSTRACT

Coupling sleeve for the interconnection of hollow prismatic objects from sheet material, such as channel segments of an air heating device, said sleeve having a U- or W-shaped cross section, the limbs of this cross section having different length for facilitating the insertion of the edge of said prismatic objects into said coupling sleeve.

1 Claim, 4 Drawing Figures

COUPLING SLEEVE

BACKGROUND OF THE INVENTION

My invention relates to a coupling member for coupling to each other two channel elements made of sheet material. These channel elements may e.g. consist of sections of an air channel of an air heating device to be used in an air circulation or conditioning system. Such channel elements are usually interconnected by means of screw bolts, rivets, welded joints etc.

My invention aims to provide a coupling member by means of which various channel elements can be interconnected in a manner which is less time consuming and less complicated in comparison with the known connection methods.

SUMMARY OF THE INVENTION

According to my invention the coupling member consists of a coupling strip or sleeve with sectional form such that it can receive the ends of the channel elements. The only requirement for interconnecting two channel elements is therefore to slide them into the recesses of the respective sleeve. Apart from the fact that this assembly is detachable, and can be easily mounted, while its construction is simple, it also meets sufficiently the requirements imposed from the aesthetic view point. Furthermore the edges of the channel elements need no special pre-treatment nor need they meet strict requirements imposed for tolerance. It is not necessary for instance that the edges of a channel element lie exactly in a particular transverse plane since the sleeve can easily correct small variations in size.

SURVEY OF THE DRAWINGS

DESCRIPTION OF PREFERRED EMBODIMENTS

Figure 1:
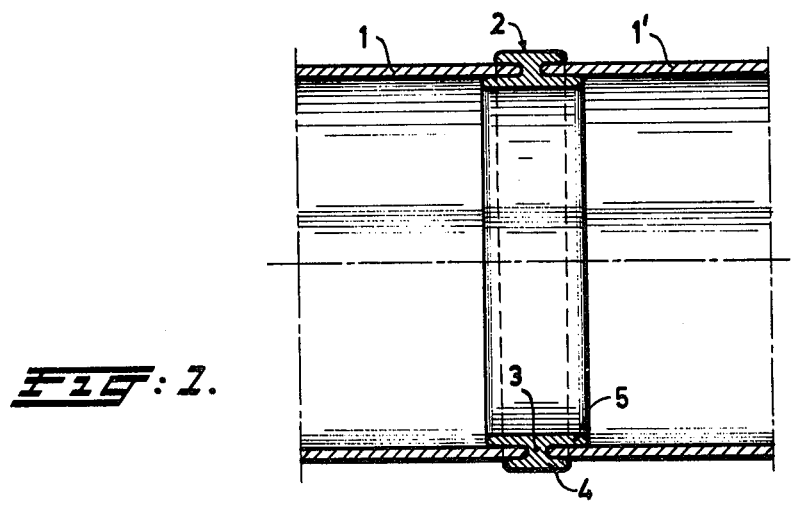
FIG. 1 shows a longitudinal section through an assembly of two partially shown channel elements, which are interconnected by a coupling sleeve according to a first embodiment of my invention.

In FIG. 1 two channel elements 1,1' are connected by a coupling sleeve 2 according to my invention. The cross section of the channel elements 1,1' may have any arbitrary shape. The outline of the coupling sleeve 2 corresponds to the shape of the cross section of the channel elements 1,1'.

Coupling sleeve 2 shows in sectional form two parallel flanges or limbs 4,5 interconnected by a web portion 3. The two flanges 4,5 enclose the edges of channel elements 1,1' since the length of web portion 3 corresponds to the thickness of the sheet material from which the channel elements 1,1' are manufactured.

Flange 5 which is on the inside of the channel elements 1,1' is wider than flange 4 situated on the outside. When mounting the connection it becomes possible to apply at first the coupling sleeve by the wider flange 5 against the innerwall of the channel elements 1,1'. Subsequently the channel elements 1,1' can be slid towards each other, while one need only see to it that the narrow flange 4 falls over the outer wall of the channel elements 1,1'.

Figure 2:
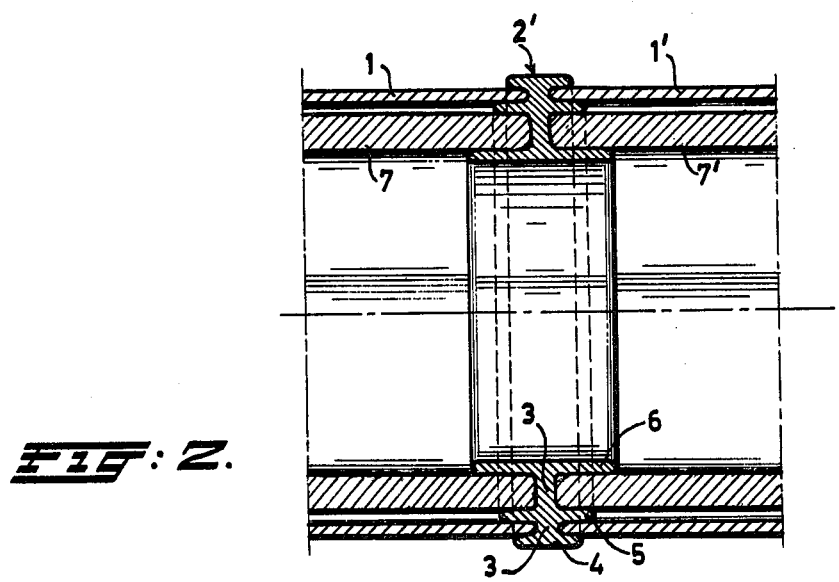
FIG. 2 shows a longitudinal section through an assembly of two partially represented channel elements which are provided with a layer of insulating material and which are interconnected by a sleeve according to a second embodiment of my invention.

The coupling sleeve 2' shown in FIG. 2 has three parallel limbs or flanges 4, 5, 6 and is destined for interconnection of the channel elements 1,1', which are each provided with a layer 7,7' of e.g. insulating material like glass wool. The flanges 4, 5, 6 differ mutually as to width. The widest flange 6 is on the inside of the channel elements 1,1' and the narrowest is on the outside. Since the flanges differ in width, the whole can be stepwise assembled and the various layers need not simultaneously fall into the openings meant therefor.

Figure 3:
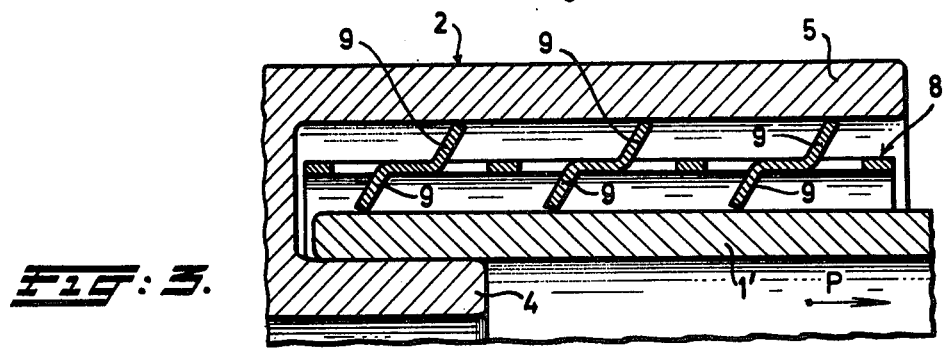
FIG. 3 shows on a larger scale a detail of a section through a coupling sleeve, a fixing member being applied.
Figure 4:
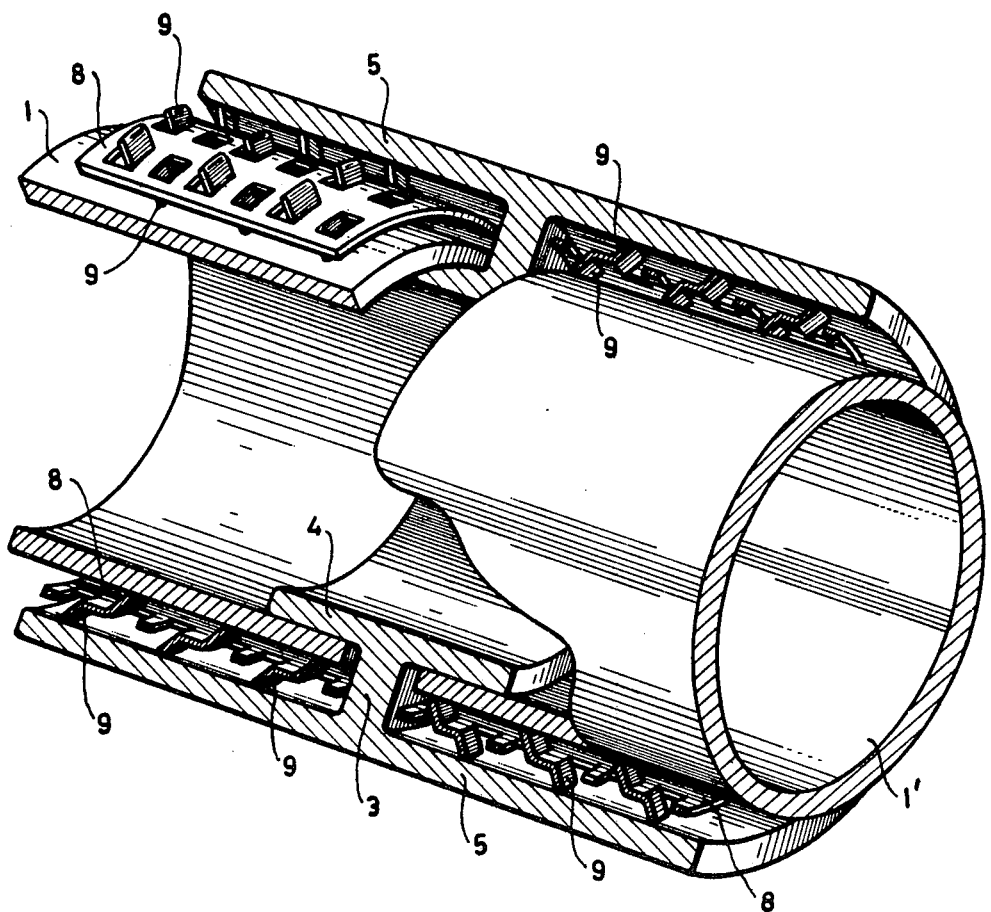
FIG. 4 is an isometric view of FIG. 3.

FIG. 3 shows an embodiment in which a fixing element is disposed between flanges 4,5 of the coupling sleeve 2. This fixing element consists of a loose resilient strip 8 provided with obliquely protruding teeth 9. When the channel element 1' moves in the direction indicated by the arrow P the fixing element becomes wedged between the flange and the channel element 1', whereby this shift is counteracted. A shift in the opposite direction can, however, be performed without any difficulty. Strip 8 ensures therefore a firm connection between coupling sleeve 2 and channel element 1', while the whole structure can be assembled easily.

It is evident that the front ends of the channel elements 1,1' of the layers 7,7' need not necessarily lie against the web portion 3. Therefore the shape exactness of the ends of the channel elements 1,1' need not meet strict requirements. For a proper functioning of the coupling sleeve it suffices that the inner- and outer walls of the channel elements 1,1' and the layers 7,7' contact the concerning flange 4 and 5 or 5 and 6 respectively.

Besides for coupling the channel elements 1,1' to each other, the coupling sleeve 2,2' can also be used for disposing end covers on the channel elements 1,1'.

The channel elements 1,1' which consist of short units can be assembled by means of connecting sleeves 2,2', so as to form air channels of any desired length.

What I claim is:

1. For use in interconnecting ventilation duct elements made of sheet material having smooth end portions, a coupling member comprising a coupling sleeve having at least two substantially spaced apart parallel flanges interconnected by a web portion, said flanges differing mutually as to axial length, the shortest flange adjoining one end of the web portion and the longest flange adjoining the other end of said web portion, the surfaces of the flanges which face one another being parallel and wedge locking means between said coupling sleeve and said ventilation duct elements and positioned on each side of said web portion and comprising a loose resilient strip having a plurality of upwardly and downwardly obliquely protruding teeth formed integrally from said strip, said teeth being disposed in a plurality of rows extending longitudinally and transversely to the major axis of said coupling sleeve, whereby each duct element may be easily inserted in one direction between the strip and one of the flanges and when the duct element is moved in the opposite direction said teeth will engage and lock said duct element to said coupling sleeve.

* * * * *